United States Patent [19]
Price

[11] 3,715,830
[45] Feb. 13, 1973

[54] SELF-PROPELLED FISHING LURE

[76] Inventor: Benjamin W. Price, Nebo Route 1, Box 222, Marion, N.C. 28761

[22] Filed: Feb. 25, 1971

[21] Appl. No.: 118,847

[52] U.S. Cl. ................................................43/26.2
[51] Int. Cl. ..............................................A01k 85/06
[58] Field of Search............43/26.1, 26.2, 17.5, 17.6, 43/17.1, 3; 46/92, 93, 94

[56] References Cited

UNITED STATES PATENTS

| 2,817,920 | 12/1957 | Mitchell et al. | 43/26.2 |
| 2,920,318 | 1/1960 | Balcken et al. | 43/17.1 |
| 1,446,816 | 2/1923 | Taylor et al. | 43/26.2 |
| 2,814,146 | 11/1957 | Propp | 43/3 |

Primary Examiner—Warner H. Camp
Attorney—Richards & Shefte

[57] ABSTRACT

An artificial self-propelled fishing lure including a generally cylindrical body portion in which are carried an electric motor and a battery, the electric motor being connected to a shaft which extends through an end wall of the body portion to a connection with a driving propeller. The body portion is made of two parts which are rotatable with respect to one another about the longitudinal axis of the body portion, and the battery and electrical motor contacts are arranged to be engaged at a selected rotational positional of said body parts whereby the motor will operate the driving propeller. To prevent water from entering the body portion at the propeller shaft and reaching the motor, annular sealing members are fitted to the propeller shaft for engagement, respectively, with the interior wall surface at the end wall of the body portion and with the motor, and a biasing spring is arranged to urge these sealing members into engagement with the motor and the wall surface respectively. The shaft receiving openings in the sealing members are conical to provide a cavity between the shaft and the sealing members, and these cavities are filled with grease or the like which prevents water from flowing along the shaft. The cavities may be closed by cap members to retain the grease in the spaces, and the biasing spring may abut the cap members to hold them in place.

4 Claims, 4 Drawing Figures

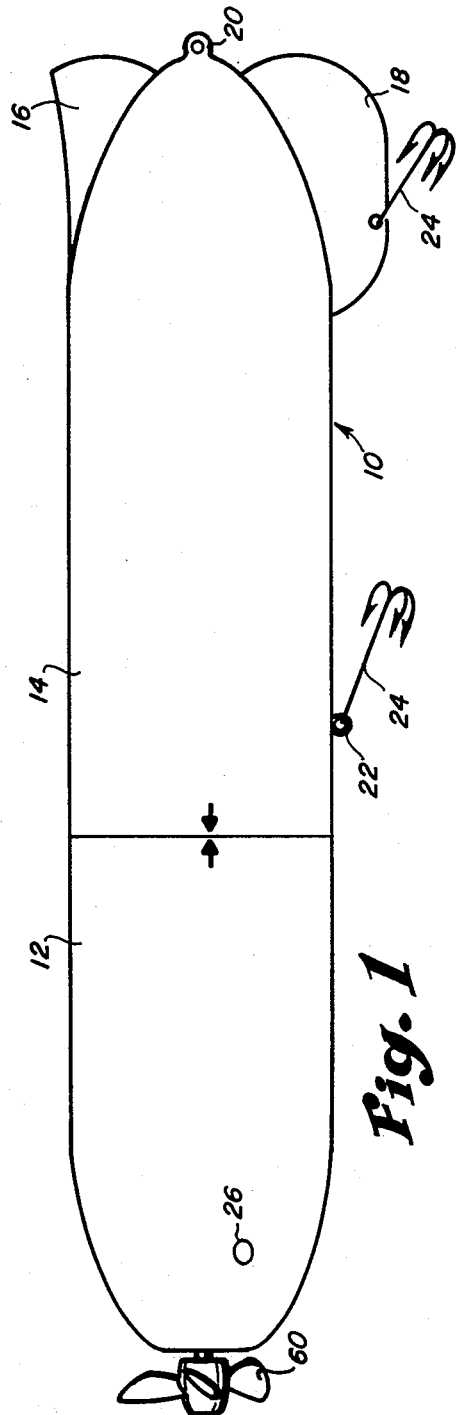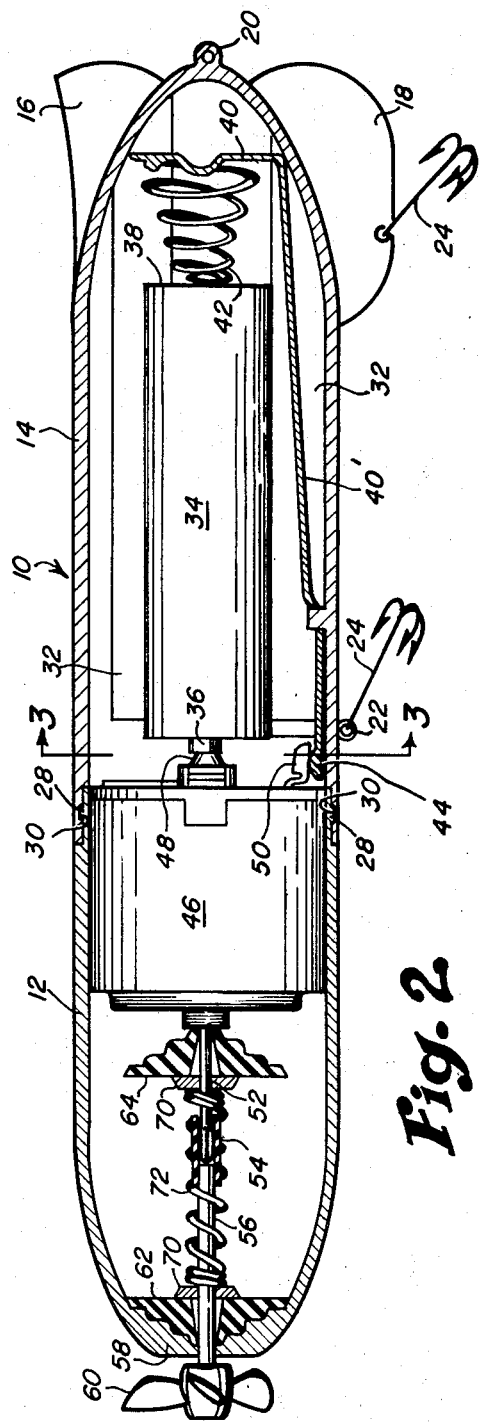

INVENTOR
BENJAMIN W. PRICE

BY

RICHARDS & SHEFTE
*ATTORNEYS*

SELF-PROPELLED FISHING LURE

BACKGROUND OF THE INVENTION

Artificial fishing lures are, and have been in general use for some time, and they are designed for attachment at the end of a fishing line whereupon they are cast by the angler and reeled in using conventional tackle. These artificial fishing lures assume an infinite variety of sizes and shapes, and many include "spinners" or similar appendages arranged to be moved by the water flowing across the line as it is pulled through the water, and the fish are attracted to the lure as a result of such movement.

While conventional artificial fishing lures of this sort have found wide acceptance, only relatively experienced fishermen can use such lures properly because of the handling skill needed to cast the lure accurately, and to reel in the lure in a manner which will attract fish. Consequently, inexperienced fishermen (i.e. children) encounter considerable difficulty in using conventional artificial fishing lures correctly, and even experienced fishermen are sometimes limited in such use because of natural barriers (i.e. overhanging branches) which render it impossible to cast the lure to a desired point.

By the present invention, an artificial fishing lure is provided which overcomes the aforementioned drawbacks, and which is extremely versatile as well as easy to use.

SUMMARY OF THE INVENTION

The artificial fishing lure of the present invention is entirely self-propelled by virtue of a motorized drive arrangement fully contained within the body of the lure itself, and this motorized drive arrangement includes a unique switch arrangement for selectively energizing the lure. In addition, the lure is completely sealed whereby water cannot leak into the lure and damage the electrical components of the motorized drive arrangement.

In the disclosed embodiment of the present invention, the self-propelled fishing lure includes an elongated, generally cylindrical body portion formed in two parts that overlap longitudinally with a tongue-and-groove connection that provides a water-tight seal while simultaneously allowing the two body parts to be relatively rotatable with respect to one another and to be separated, if desired, for maintenance purposes.

One of these body parts includes inwardly extending ribs on which a small dry-cell battery is supported in longitudinal alignment with the axis of the lure. This one body part also includes a contact for connection with one of the battery terminals, such contact being fixed in relation to the body part for rotation therewith, and a biasing element is utilized to urge the battery in a direction toward the other body part.

The other body part has a small electric motor frictionally carried therein for rotation therewith, and this motor is arranged to have one contact which abut one terminal of the aforementioned battery and to have a second contact carried by the other body part when the two body parts are rotated to a selected position.

The electric motor includes a shaft arrangement that extends through an opening in the end wall of the other body part to a connection with a driving propeller which propels the lure when the motor is energized. To insure that no water will leak into the lure at the shaft opening in the body part end wall, a unique sealing arrangement is provided which includes a pair of resilient annular sealing members that abut, respectively, the motor and the interior wall surface of the body part end wall. These sealing members have centrally located conical openings through which the drive shaft arrangement extends with the smaller end of the conical opening engaging the shaft and the larger end of the conical openings forming a cavity about the shaft. These cavities are filled with a water repellant grease and cap members are disposed over the open ends of the cavities to contain the grease therein. A coil spring is located about the shaft and acts oppositely against the two cap members to maintain them in place and to urge the sealing members into engagement with the motor and interior wall surface of the body part end wall, respectively. Preferably, this interior wall surface and the sealing member in engagement therewith have corresponding stepped configurations whereby the sealing member will nest with this wall surface under the urging of the coil spring.

BRIEF DESCRIPTION OF THE DRAWINGS

FIG. 1 is an elevation view of a fishing lure embodying the present invention;

FIG. 2 is a vertical sectional view taken along the center lure of the fishing line illustrated in FIG. 1;

DESCRIPTION OF THE PREFERRED EMBODIMENT

Figure 3:
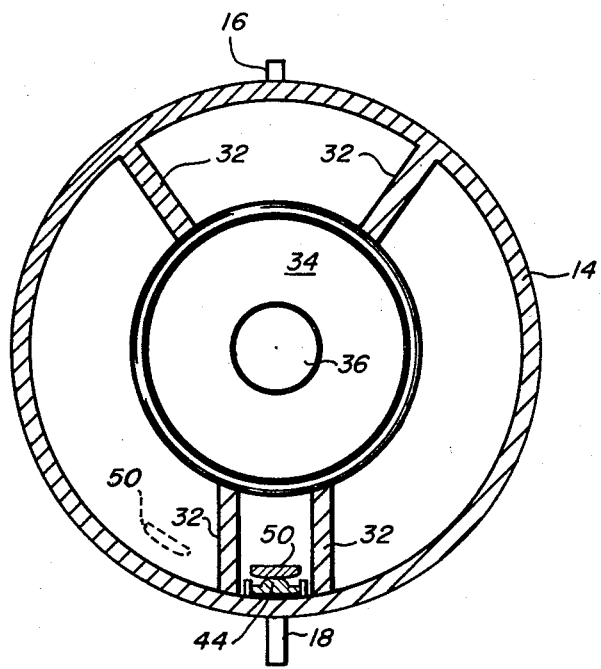
FIG. 3 is a vertical sectional view taken along line 3—3 in FIG. 2.

Looking now in greater detail at the accompanying drawings, FIGS. 1–4 illustrate a fishing lure 10 having an elongated, generally cylindrical body portion formed in two parts 12, 14 which are preferably made of plastic. The rear body part 14 is formed with an upstanding fin 16 and a lower fin 18 which serves a dual purpose of simulating the caudal fin of a fish and of stabilizing the lure 10 as it is propelled through the water in a manner to be described in greater detail presently. The rear body part 14 is also formed with a rearwardly located eyelet 20 to which a fishing line (not shown) may be attached, and a lower eyelet 22 in which a hook 24 is secured, a similar hook 24 also being shown attached to the lower fin 18 through an opening formed therein. It is to be understood, of course, that any number of hooks could be used at any desired location along the body parts 12 and 14. The front body part 12 includes a recess formed in each side thereof to simulate the eyes of a fish, one of such recesses being indicated by the reference numeral 26 in FIG. 1.

The front and rear body parts 12, 14 are formed with overlapping end portions, the end portion of front body part 12 including a tongue 28 and the rear body part 14 including a complementary groove 30 whereby when the two body parts 12 and 14 are joined together, the tongue-and-groove connection will prevent longitudinal displacement of the body parts 12 and 14 while permitting them to rotate relative to one another about the longitudinal axis of the lure 10. It will be noted that the overlapping connection of the body parts 12 and 14 provides a smooth and continuous outer surface for the lure 10, and there is a substantial mating surface area which provides a watertight seal at the connection point. The overlapping end portion of the rear body part 14 may have a radius which is slightly smaller than the maximum radius of the overlapped end portion of front body part 12 to assure a tight fit while still allowing the body parts to be rotated relative to one another and to be longitudinally separated if sufficient pulling force is applied for this purpose.

The rear body part 14 is formed internally with a plurality of inwardly projecting ribs 32 which are angularly spaced to support a conventional dry cell battery 34 (preferably size AA) at a disposition along the longitudinal axis of the lure 10, the battery 34 having the usual front terminal 36 and rear surface terminal 38. A battery contact 40 made of electrically conductive material is secured within the rear body part 14 for rotation therewith, and an electrically conductive spring element 42 is interposed between the upstanding portion of the battery contact 40 and the rear surface terminal 38 of the battery 34, the spring 42 acting to urge the battery 34 toward the front body part 12 and also serving to electrically connect the battery 34 with the battery contact 40. The longitudinally extending portion 40' of the battery contact 40 is formed with a raised end 44.

The front body part 12 is provided with an electric motor 46 mounted therein with a tight friction fit, a suitable electric motor being model R-20 manufactured by Best Motor Co. in Hong Kong. The motor 46 has a first contact 48 located centrally of the lure 10 for abutment with the first battery terminal 36 as it is urged forward by the spring 42. A second motor contact 50 is located adjacent the outer wall portion of the front body part 12 and projects into the rear body part 14 (see FIG. 2) for engagement with the end 44 of the battery contact 40 when the body parts 12 and 14 are at the selected position shown in FIGS. 2 and 3. When the motor contact 50 engages the battery contact end 44 in this manner, an electrical circuit is completed between the battery 34 and the motor 46 to energize the latter. To deenergize the motor 46, the body parts 12 and 14 are rotated slightly with respect to one another until the motor contact 50 and battery contact end 44 are moved to a point of disengagement as shown by the dotted line position of the battery contact 50 in FIG. 3.

The forward end of the motor 46 has a drive shaft 52 projecting therefrom which is connected by a plastic sleeve 54 to a propeller shaft 56 that extends through an opening in the front end wall 58 of the front body part 12 to a connection with a three-bladed propeller 60. Thus, when the motor 46 is energized as previously described, the propeller 60 will be rotated to propel the lure forwardly through the water. The plastic sleeve 54 is designed to translate the rotation of the drive shaft 52 to the propeller shaft 56 during normal operating conditions and to permit relative rotation between these shafts should the propeller 60 become entangled in foreign matter and stop, thereby preventing the motor 46 from being burned out as a result of such entanglement.

Since the lure 10 is propelled in a forward direction (toward the left in FIGS. 1 and 2) and since the rotating propeller shaft 56 passes through an opening in the front end wall 58, there is a substantial tendency of water to leak into the lure 10 along the propeller shaft 56, and it is quite obvious that a concentration of water within the lure 10 could adversely affect its operation and could substantially damage the electric motor 46. Accordingly, the present invention provides a unique sealing arrangement which prevents water leakage into the lure 10 and along the shafts 52 and 56.

Figure 4:
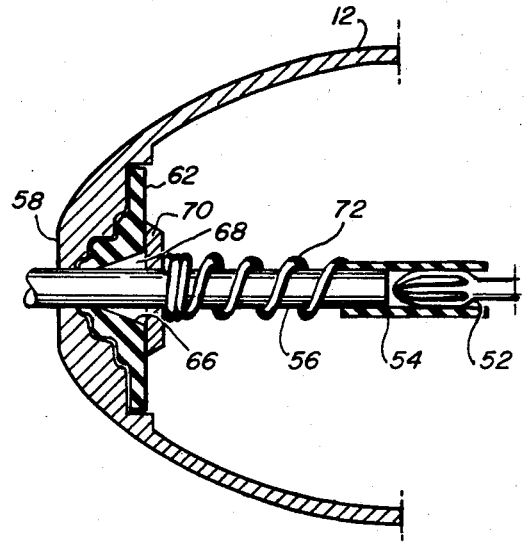
FIG. 4 is a detail view illustrating a portion of the sealing arrangement of the present invention.

This sealing arrangement consists of a pair of annular sealing members 62, 64 which are disposed, respectively, in abutment with the interior surface of the end wall 58 and in abutment with the front end of the motor 46 as best seen in FIG. 2. Each of the annular sealing members 62, 64 is formed with a centrally located conical opening 66 (FIG. 4) through which the shafts 52 and 56, respectively pass. These conical openings 66 are designed so that the smaller ends thereof will engage the shafts 52, 56 respectively, and the larger ends thereof are spaced from the shafts to form an open cavity 68 as best seen in FIG. 4. These cavities 68 are both filled with any appropriate water repellant grease (not shown), and this grease is retained in the cavities 68 by cap members 70 fitted about the shafts 52, 56 and urged into abutment with the annular sealing members 62, 64, respectively, by a coil spring 72 disposed over the shafts 52, 56 and the sleeve 54 to act oppositely against the cap members 70. It will be noted that the coil spring 72 also acts to urge the sealing members 62, 64 into contact with the interior surface of the front end wall 58 and the motor 46. The interior surface of the front end wall 58 has a stepped configuration whereby it will be nested with the interior surface of the front end wall 58 under the urging of spring 72. Thus, a substantial sealing surface is provided between the sealing member 62 and the interior surface of the front end wall 58 to prevent any water leakage thereat, and the grease filled cavities 68 will effectively prevent any water leakage along the shafts 52, 56. Also, the sealing member 64 is pressed against the front wall of motor 46 to assure that water will not get into the motor 46 along the shift 56, and it will be noted that while the stepped configuration of the sealing member 64 is non-functional, it allows the two sealing members to be entirely interchangeable.

To use the lure 10, it is attached at eyelet 20 to a fishing line, and just prior to placing the lure in the water, the front and rear body parts are relatively rotated to a selected position at which the motor contact 50 engages the battery contact end 44 to energize the motor 46 and rotate the propeller 60, this selected position of the body parts being conveniently indicated by matching indicator arrows provided thereon as seen in FIG. 1. When the lure 10 is placed in the water, it will be propelled therethrough by the rotating propeller 60, and its direction may be readily controlled by manipulating the fishing line attached to the rear eyelet 20. In this way, the course which the lure 10 takes can be determined, and even the inexperienced fisherman can get the lure at substantially any location in the water. Also, it is apparent that the novelty of directing the course of a self-propelled lure, rather than simply reeling the lure in, will be an attractive feature of the present invention. Finally, it will be noted that the rotating propeller in addition to propelling the lure 10, will tend to attract fish in the same manner as "spinners" and similar devices.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. An artificial self-propelled fishing lure including an elongated, generally cylindrical body portion, battery means and electric motor means carried in said body portion, means selectively engaging the terminals of said battery to the electric contacts of said motor means to energize the latter, a rotatable propeller disposed beyond the front end of said body portion, and a shaft means connecting said propeller to said motor means whereby said propeller will propel said fishing lure through the water when said motor means is energized, said shaft means extending through an opening in one end wall of said body portion, and sealing means including a pair of annular sealing members formed of resilient material with said shaft means extending through each of said sealing members, one of said sealing members being disposed adjacent the interior wall surface of said one end wall of said body portion in sealing engagement therewith and the other sealing member being disposed adjacent said motor means in sealing engagement therewith, and biasing means urging said sealing members into contact with said interior wall surface and said motor means, respectively.

2. An artificial self-propelled fishing lure as defined in claim 1 and further characterized in that said interior wall surface of said body portion end wall has a stepped configuration, and in that said one sealing member has a corresponding stepped surface configuration whereby said one sealing member will nest with said interior wall surface in sealing relation therewith under the urging of said biasing means.

3. An artificial self-propelled fishing lure as defined in claim 1 and further characterized in that each of said sealing members is formed with a central opening for receiving said shaft means, said central opening being conically formed with the sealing member positively engaging said shaft means adjacent the small end of said conical opening and with the sealing member being spaced from said shaft means adjacent the larger end of said conical opening to provide a cavity thereat, in that a water repellant grease fills said cavity, and in that said water repellant grease is retained in said respective cavities by two cap members disposed, respectively, on said shaft means adjacent the facing end of said sealing members to cover the larger ends of said conical openings therein, said biasing means acting against said cap members to hold the same in place.

4. An artificial self-propelled fishing lure including an elongated, generally cylindrical body formed in two parts joined together near the mid-portion of said body by an annular tongue-and-groove connection forming a water-type seal at said connection and permitting said body parts to be rotatable with respect to one another; one of said body parts being formed with inwardly projecting ribs supporting a dry cell battery for longitudinal extension within said one body part, said battery having first and second terminals at the respective ends thereof and said one body part including a battery contact member carried for rotation therewith, said battery contact being connected to said second battery terminal by an electrically conductive spring urging said battery in a direction toward the other said body part and said battery contact also including a portion extending longitudinally within said one body portion to present a battery contact adjacent said other body part; said other body part having an electric motor carried therein, said motor having a first contact arranged in abutting relation to said first battery terminal and having a second contact arranged to engage said battery contact and energize said motor when said body parts are rotated to a selected relative position and to disengage said battery contact at all other relative positions of said body parts whereby said motor will be deenergized, said motor being connected to shaft means extending through an opening in one end wall of said other body part to a connection with a propeller for propelling the fishing lure when said motor is energized; and sealing means associated with said shaft means to prevent water from passing through said body portion opening and along said shaft, said sealing means including a pair of annular sealing members abutting, respectively, said motor and the interior wall surface of said body portion end wall, each of said sealing members being formed with centrally located conical openings through which said shaft means extends, said shaft means being engaged by said sealing members adjacent the smaller ends of said conical openings therein and being spaced from said sealing members adjacent the larger ends of conical openings to form cavities thereat, a water repellant grease filling said cavities between said shaft means and said respective sealing members, cap members being disposed in abutting relation with the facing surfaces of said respective sealing members to close the open end of said grease filled cavities, and biasing means acting between said cap members to maintain the same in abutment with said respective sealing members and to urge said sealing members into contact with said other body part end wall and said motor, respectively.

* * * * *